United States Patent
Thiyagarajah

(10) Patent No.: US 8,313,029 B2
(45) Date of Patent: Nov. 20, 2012

(54) APPARATUS AND METHODS FOR DECODING IMAGES

(75) Inventor: Mohanaraj Thiyagarajah, Scarborough (CA)

(73) Assignee: Seiko Epson Corporation, Tokyo (JP)

( * ) Notice: Subject to any disclaimer, the term of this patent is extended or adjusted under 35 U.S.C. 154(b) by 1330 days.

(21) Appl. No.: 12/023,590

(22) Filed: Jan. 31, 2008

(65) Prior Publication Data

US 2009/0194590 A1   Aug. 6, 2009

(51) Int. Cl.
*G06K 7/10* (2006.01)
(52) U.S. Cl. .................................. 235/462.01
(58) Field of Classification Search .............. 235/462.01
See application file for complete search history.

(56) References Cited

U.S. PATENT DOCUMENTS

| | | | |
|---|---|---|---|
| 5,319,181 A * | 6/1994 | Shellhammer et al. | .. 235/462.09 |
| 5,471,533 A | 11/1995 | Wang et al. | |
| 5,523,552 A | 6/1996 | Shellhammer et al. | |
| 5,811,787 A | 9/1998 | Schuessler et al. | |
| 5,825,010 A | 10/1998 | Charych et al. | |
| 5,880,453 A * | 3/1999 | Wang et al. | ............. 235/462.01 |
| 5,988,505 A | 11/1999 | Shellhammer | |
| 6,206,288 B1 | 3/2001 | May et al. | |
| 6,490,376 B1 | 12/2002 | Au et al. | |
| 6,651,893 B2 | 11/2003 | He et al. | |
| 6,672,511 B1 | 1/2004 | Shellhammer | |
| 6,708,884 B1 | 3/2004 | Su et al. | |
| 2004/0195330 A1 | 10/2004 | Silverbrook et al. | |
| 2005/0077358 A1 | 4/2005 | Boehm et al. | |
| 2005/0077359 A1 | 4/2005 | Boehm et al. | |
| 2006/0011725 A1 | 1/2006 | Schnee | |
| 2006/0097062 A1 | 5/2006 | Cheong et al. | |
| 2006/0098241 A1 | 5/2006 | Cheong et al. | |
| 2006/0175414 A1 | 8/2006 | Nakamura | |
| 2007/0071320 A1 | 3/2007 | Yada | |

* cited by examiner

*Primary Examiner* — Kristy A Haupt

(57) ABSTRACT

A method and system for determining an orientation of a data-encoding symbol, such as a PDF417 bar-code symbol, and for decoding the encoded data. One example method may include detecting an encoded data sequence at a first location of the symbol and at a second location of the symbol. The symbol orientation may be determined at least partially based on the first and second locations. Strings of data encoded in the symbol may then be decoded by processing the strings to generate indices and accessing a codeword array using the indices to look up codewords corresponding to the strings. A match between a string and a codeword may be verified with data in the codeword array.

10 Claims, 9 Drawing Sheets

*400*

| 0 | 1 | 2 | 3 | ... | 395 | ... | 928 | ⟵ 404 |
|---|---|---|---|---|---|---|---|---|
| 31111136 | 49102937 | 55887833 | 18263328 | | 24241112 | | 29373391 | ⟵ 402 |

| 0 | 1 | 2 | 3 | ... | 395 | ... | 928 | ⟵ 412 |
|---|---|---|---|---|---|---|---|---|
| -1 | -1 | -1 | -1 | | -1 | | -1 | ⟵ 414 |
| -1 | -1 | -1 | -1 | | -1 | | -1 | ⟵ 416 |
| -1 | -1 | -1 | -1 | | -1 | | -1 | ⟵ 418 |

| 0 | 1 | 2 | 3 | ... | 395 | ... | 928 | ⟵ 412 |
|---|---|---|---|---|---|---|---|---|
| -1 | 930 | -1 | 4588 | | 6898 | | 1857 | ⟵ 414 |
| -1 | -1 | -1 | -1 | | -1 | | -1 | ⟵ 416 |
| -1 | 249 | -1 | 612 | | 928 | | 487 | ⟵ 418 |

| 0 | 1 | 2 | 3 | ... | 395 | ... | 928 | ⟵ 412 |
|---|---|---|---|---|---|---|---|---|
| 1859 | 930 | 2788 | 4588 | | 6898 | | 1857 | ⟵ 414 |
| 2 | 0 | -1 | -1 | | 416 | | -1 | ⟵ 416 |
| 781 | 249 | 391 | 612 | | 928 | | 487 | ⟵ 418 |

Figure 4D

APPARATUS AND METHODS FOR DECODING IMAGES

BACKGROUND

1. The Field of the Invention

Embodiments of the present invention relate to decoding images, such as bar code symbols, in which data has been encoded.

2. The Relevant Technology

Bar code symbols are a convenient means to encode data for quick and easy identification using a bar code scanner. A bar code symbol is an image having a series of bars and spaces. The widths of the various bars and spaces are designed to represent data. For example, the bars may represent strings of ones and the spaces may represent strings of zeroes.

A one-dimensional bar code symbol, such as a Universal Product Code ("UPC") symbol, encodes data in one dimension. A two-dimensional symbol, on the other hand, encodes data along two dimensions, typically forming a rectangular symbol. A two-dimensional symbol may consist of multiple one-dimensional symbols, optionally reduced in size, and stacked on top of each other in multiple rows. Thus more data may be encoded in a two-dimensional symbol than in a one-dimensional symbol. Symbol Technologies, Inc has developed a two-dimensional bar code standard called Portable Data File 417 ("PDF417"), which is capable of storing up to 2710 characters.

Two-dimensional bar code symbols, including PDF417 symbols, may be read using any suitable optical detection device, such as a rastering laser scanner or a digital imaging device, such as a camera. The data is detected by the reader and may be interpreted or recognized by an on-board computer chip or an externally connected computer. Bar code readers may be stand-alone devices or may be integrated with other devices, such as portable phones or cameras. As discussed above, patterns in the data are detected and decoded to provide via a display, for example, the original data encoded in the symbol.

However, if the bar code reader is misaligned with respect to the bar code symbol an error may occur. Bar code symbols may be designed to increase the permissible degree of misalignment by, for example, increasing the size of each row in the symbol. This is often impractical however due to spatial constraints. If a human is scanning the bar code symbol, as opposed to an automatic scanner, an attempt can be made to improve alignment on subsequent read attempts. However, this solution is time-consuming and frequently causes frustration for the scanning device operator. In addition, many applications require an automatic reader that can read a symbol without the aid of an operator. For example, the symbols on large volumes of items can be read by placing them on a conveyor belt that runs under a reader. In such applications each item's orientation with respect to the reader may vary widely.

The data encoded in a symbol is usually converted into meaningful information to be consumed by an operator or to be processed by another device, such as a computer. The process of converting the data may be a slow process depending on the complexity of the encoding used and the amount of data being decoded. A two-dimensional symbol has more encoded data than a one-dimensional bar code of equal width. Moreover, according to the PDF417 standard, alternating rows of data are encoded using different sets of codewords, thereby increasing complexity of the decoding process. Thus, the decoding of data can become very computationally intensive and time-consuming for two-dimensional symbols such as PDF417 symbols, which may tend to decrease the practical value of two-dimensional symbols.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments of the present invention are directed to apparatus and methods for determining a data-encoding symbol's orientation and for decoding the data encoded in the symbol. For example, one disclosed embodiment pertains to a method of determining an orientation of a data-encoding symbol, such as a PDF417 bar-code symbol. The method may include detecting an encoded data sequence at a first location of the symbol and detecting the encoded data sequence at a second location of the symbol. The symbol orientation may then be determined at least partially based on the first and second locations. One advantage of this approach is that accurate symbol readings can be provided even if the bar code reader is misaligned with respect to the bar code symbol.

Another embodiment of the invention relates to a method for decoding a string of bar code data. The method may include processing the string to generate an index. Next, a codeword array may be accessed using the index to look up a codeword corresponding to the string. A match between the string and the codeword may be verified with data in the codeword array.

Yet another example embodiment is directed to a device for decoding data encoded in a symbol. In an illustrated embodiment, the device includes a scanner adapted to read a plurality of symbol regions. Associated with the scanner is a processor adapted to programmably execute a series of programmable instructions to detect a data sequence encoded in a first one of the plurality of symbol regions, and to detect the data sequence encoded in a second one of the plurality of symbol regions. The processor then determines the symbol orientation based on a first point in the first symbol region and a second point in the second symbol region. In an illustrated embodiment, a scanner is adapted to read the plurality of symbol regions by scanning the symbol along scan-lines that are unaligned with the symbol orientation.

In another optional embodiment, a device for decoding bar code data is provided. The device includes a scanner that is adapted to read a string of bar code data. Associated with the scanner is a programmable processor configured to programmably execute a series of programmable instructions to process the string to generate an index, and then access a codeword array using the index to look up a codeword corresponding to the string. The processor then verifies, with data in the codeword array, a match between the string and the codeword.

Disclosed embodiments provided a number of advantages. For example, disclosed techniques for decoding bar code data are optimized so as to reduce the need for computational resources, and provide for faster processing speeds. Such efficiencies are particular advantageous in connection with two-dimensional symbols, such as PDF417 symbols.

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Additional features will be set forth in the description which follows, and in part will be obvious from the description, or may be learned by the practice of the teachings herein. Features of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further clarify the features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 4A illustrates a standard codeword array for looking up codewords corresponding to data encoded in a symbol;

FIGS. 4B-4D illustrate various stages of a new codeword array for looking up codewords corresponding to data encoded in a symbol;

DETAILED DESCRIPTION

In the following detailed description of various embodiments of the invention, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

The following description relates to example embodiments of methods and apparatus for determining bar code symbol orientation and decoding bar code symbol strings. Although the description is based on PDF417 bar code symbols, the methods and apparatus described may be applicable to other types of symbols of both one-dimensional and two-dimensional variety. As explained in greater detail below, determination of bar code symbol orientation may include detecting START and/or STOP patterns on the periphery of a bar code symbol. Once an orientation has been determined, the data encoded in a bar code symbol may be decoded using a customized array of codeword indices.

A. Symbol Orientation Detection

Figure 1:
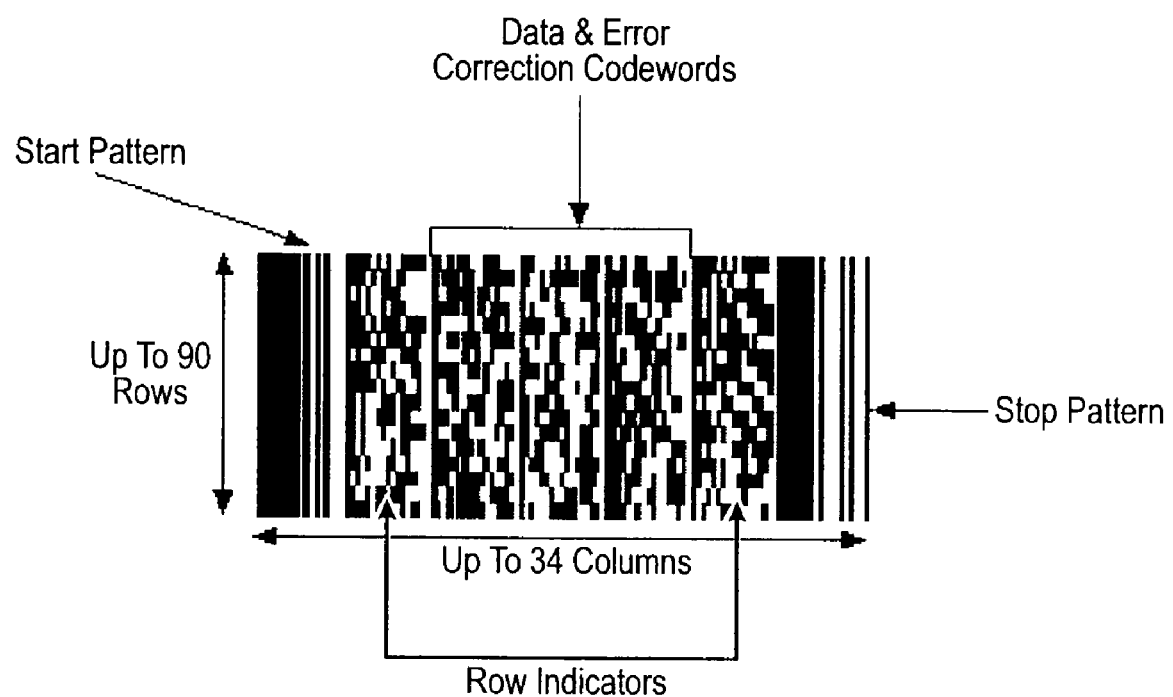
FIG. 1 illustrates an exemplary PDF417 bar-code symbol.

FIG. 1 shows an exemplary PDF417 symbol 100 whose orientation can be determined so that the encoded data can be successfully read in accordance with an example embodiment. A left periphery of symbol 100 includes a START pattern 102, which represents a unique data sequence encoded in symbol 100 and indicates the start of symbol 100. Similarly, a right periphery includes a STOP pattern 104, representing an encoded data sequence that uniquely indicates to a reader where to stop reading symbol 100. The PDF417 standard optionally permits omission of STOP pattern 104.

The data portion of symbol 100 is organized in various rows and columns between start and stop patterns 102 and 104. The PDF417 standard permits as few as three rows and up to 90 rows of data. The maximum number of columns permitted is 34. The two outer columns are row indicator columns, which, when decoded, indicate a row number. Thus, the rows of symbol 100 may be read in any order and later decoded in their proper order according to their respective row numbers.

Figure 2:
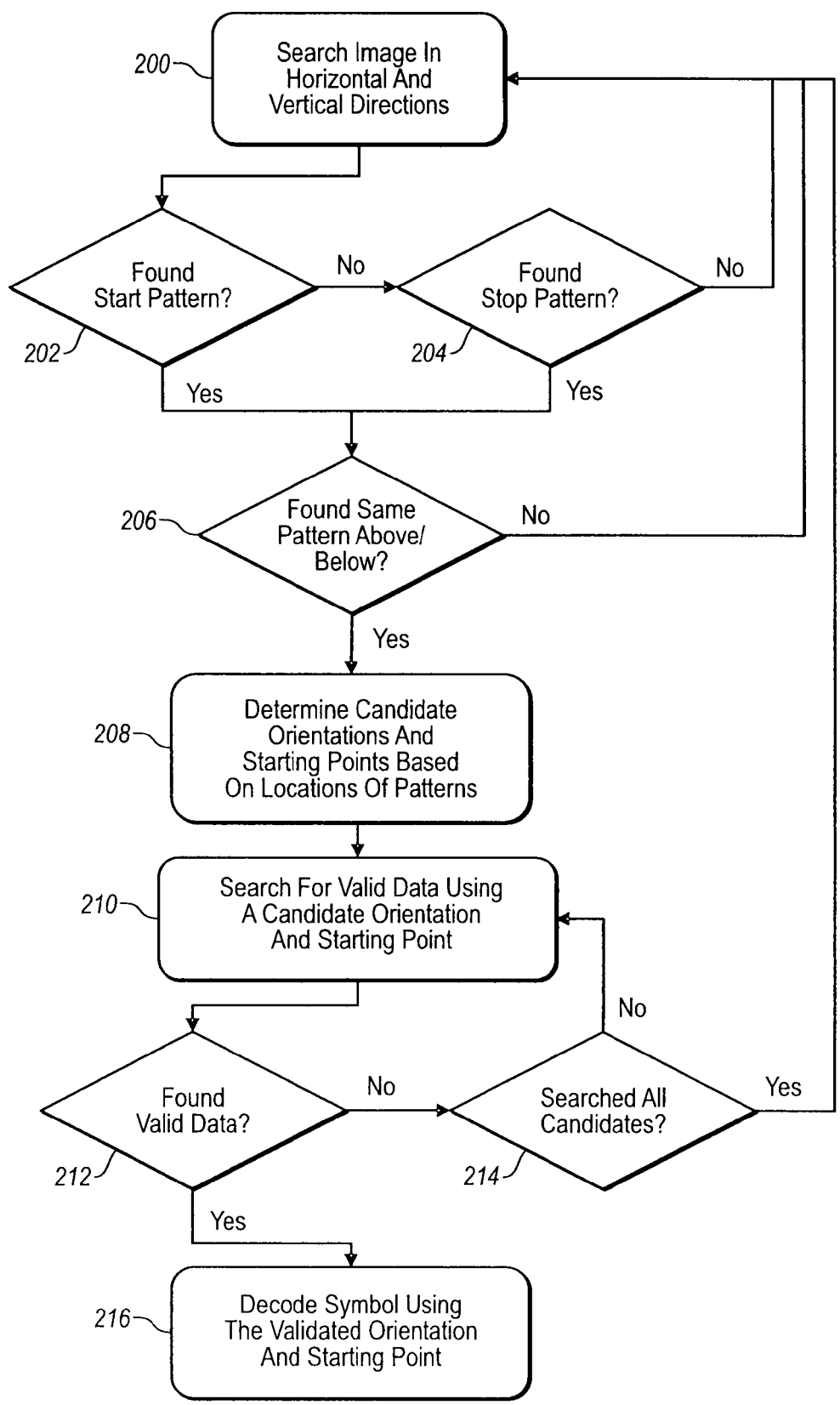
FIG. 2 illustrates a flow diagram describing one example of a method of determining a data-encoding symbol's orientation.

FIG. 2 illustrates one embodiment of a method that can be used to automatically determine an orientation of symbol 100 so that the data may be successfully decoded. First, various regions of an image containing a symbol, such as symbol 100, may be searched using horizontal and/or vertical scan-lines to find a START and/or STOP pattern (stage 200). Because the START and STOP patterns span the length of symbol 100, a skew of up to 45 degrees can be tolerated in a search for either of these patterns. Thus, to minimize search time, the search may alternate between horizontal and vertical scan-lines. For example, if symbol 100 of FIG. 1 is skewed anywhere between 0 and 44 degrees, a successful detection is more likely to result from a horizontal scan than a vertical scan of the symbol. Similarly, for a skew of between 46 and 90 degrees, a vertical scan is more likely to detect a START or STOP pattern. (At exactly 45 degrees horizontal and vertical scans are equally likely to be successful.)

If a START pattern is found (stage 202) or if a STOP pattern is found (stage 204) a search for another occurrence of the identified pattern is performed (stage 206). For example, if a first scan-line is identified as scanning over a START pattern, another nearby scan-line is likely to scan over the START pattern, albeit at a different location. In one example embodiment, the search for another occurrence of the START or STOP pattern may be performed with a scan-line that is a predetermined distance above and/or below the first scan-line corresponding to the first identified occurrence. The predetermined distance may correspond to a minimum height permitted by the standard governing the identified symbol. For example, according to the PDF417 standard, the minimum permissible height of a PDF417 symbol is three rows of data, which corresponds roughly to about 10 scan-lines in certain scanners. Thus, in certain embodiments, a scanner may search for a second occurrence of a START or STOP pattern 10 scan-lines above and/or below a first identified occurrence the pattern.

Figure 3:
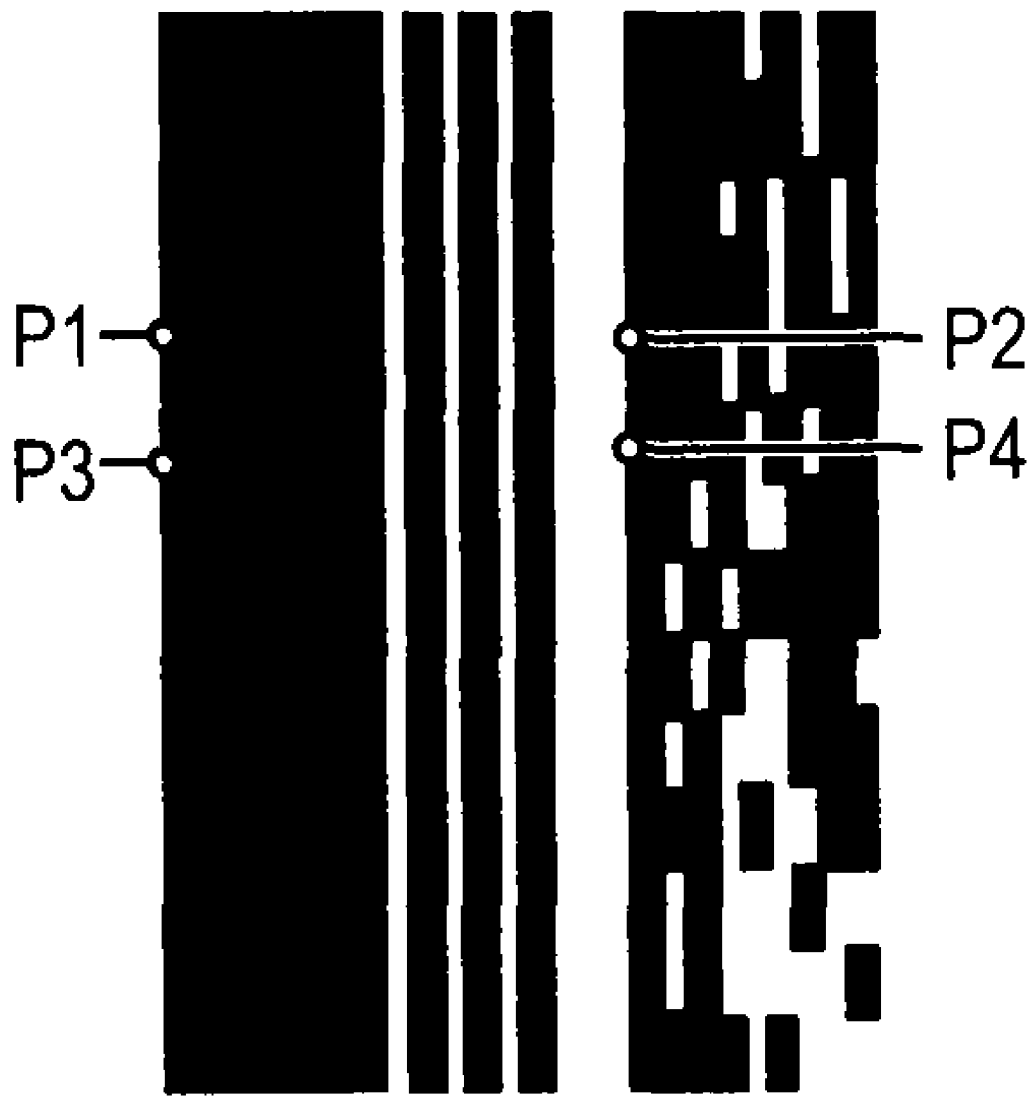
FIG. 3 illustrates a portion of an exemplary PDF417 barcode symbol for purposes of further illustrating the method of FIG. 2.

Upon detecting at least two instances of either a START or a STOP pattern, the method then determines candidate angles based on the locations of the instances (stage 208). In particular, the candidate angles may be determined using points corresponding to a beginning of the identified pattern and/or points corresponding to an end of the identified pattern. For example, as shown in FIG. 3, points P1 and P2 correspond, respectively, to a beginning and an end of a first scan-line that crosses through a START pattern and points P3 and P4 correspond, respectively, to a beginning and an end of a second scan-line that crosses through the START pattern. The first scan-line may correspond to a first detected instance of the START pattern and the second scan-line may correspond to a subsequently detected instance of the START pattern.

Using pair of points (P1, P3) and/or pair of points (P2, P4) in FIG. 3, one or more candidate starting points and angles of orientation may be determined using basic geometric relationships. Candidate angles of orientation may include, for example: angles perpendicular to a line between points P1 and P3, in both left and right directions, and angles perpendicular to a line between points P2 and P4, in both left and right directions. Each of these angles may differ if, for example, the paper on which symbol 100 is printed has been torn or folded, or if the ink used to print symbol 100 has been smeared. Candidate starting points may include a midpoint between P1 and P3 and a midpoint between P2 and P4, or any other points along the line connecting P1 and P3 or the line connecting P2 and P4. Moreover, orientation information may be preserved from stages 202 and 204 to eliminate certain unlikely candidate orientations. For example, if the START and STOP patterns are not symmetrical, as in PDF417 symbols, a general orientation may readily be deduced. Thus, in certain embodiments, angles corresponding to a left direction with respect to the line connecting points P1 and P3 and a right direction with respect to the line connecting points P2 and P4 may automatically be eliminated as candidate orientations.

Using the candidate starting points and orientations determined in stage 208, the method may then perform a search for valid data (stage 210). For example, if a valid left or right row indicator is detected proximate to a candidate starting point using a candidate orientation then the candidate starting point and orientation are valid. If no valid data is found (stage 212), the method determines if all candidate starting points and orientations have been evaluated (stage 214). If not, then another candidate starting point and orientation may then be evaluated (stage 210). On the other hand, if valid data is found at stage 212, the symbol is then decoded using the validated candidate starting point and orientation (stage 216).

For example, in FIG. 3, a mid-point between P1 and P3 and an orientation of 90 degrees with respect to the line connecting points P1 and P3 will likely return positive results at stage 212 and decoding may commence (stage 216). Because certain symbols, such as PDF417 symbols, have row information encoded in each row the decoding process may begin at any row. Thus, if a decoding starting point corresponds to row 3, for example, scan-line starting points for all other rows may readily be deduced using row 3 as a reference. If all candidate starting points and orientations have been evaluated without finding any valid data, the method start another START and/ or STOP pattern search (stage 200). Alternatively, the method may end return an error code (not shown).

In addition to the various alternatives described above, various other versions of the method in FIG. 2 may be implemented. For example, various stages may be omitted or added and the order of stages shown may differ. For example, although stage 202 is shown before stage 204 and after stage 200, the order of stages 202 and 204 could be switched. That is, checking for detection of a STOP pattern could be performed before checking for detection of a START pattern.

B. Symbol Decoding

In addition to determining orientation of symbols, exemplary embodiments may decode symbol data using a customized codeword array or look-up table. Predetermined codewords may be used to encode data in a symbol. The codewords may be selected according to various criteria, including error detection and/or correction. An encoder may use the codeword array to encode the data and the same or similar array may be used later to decode the data when read by a scanner. For example, under the PDF417 standard, a set of 929 different codewords represent the "vocabulary" or "language" that a PDF417 reader can read and convert into meaningful information. In addition, a different set of codewords may be used in each row, repeating every third row, to avoid errors. However the codewords of each set may have a one-to-one correspondence with the codewords of the other sets. Therefore, although the embodiments described herein reference a single set of codewords, the same techniques and principles may be applied to embodiments having a different set of codewords for alternating rows of encoded data.

FIG. 4A illustrates a standard codeword array 400 and FIGS. 4B-4D illustrate various stages of a customized codeword array ("NewArray") 410 as it is being formed. Standard codeword array 400 may include a row 402 of various possible characters or codeword strings that a scanner may read in a symbol and a row 404 of corresponding codeword indices. The exemplary codeword strings shown in row 402 each consist of 8 numbers, with each number corresponding to a width of a bar or space of a symbol. For example, the codeword string "31111136", which corresponds to codeword 0, may be a set of alternating bars and spaces of differing widths, such as a bar 3 units wide, followed by a space 1 unit wide, followed by a bar 1 unit wide, and so on, with a final space that is 6 units wide. Thus, a scanner that detects this set of alternating bars and spaces may send the codeword string "31111136" to a processor, which uses a look-up table, such as standard array 400, to determine that the codeword string's corresponding codeword is codeword 0. The reading process may be repeated multiple times to ensure an accurate read. In addition, further processing may be performed on the codewords to convert them into meaningful information. Furthermore, although a codeword string of 8 numbers are shown, other string lengths may be used, as specified by the relevant symbol standard.

However, use of standard codeword array 400 to look up codewords may be time consuming because it requires comparing a long string with, potentially, up to 929 other long strings. Another method of decoding data, in accordance with an example embodiment, uses NewArray 410, which is shown at various stages of formation in FIGS. 4B-4D, and which may be formed according to the methods shown in FIGS. 5 and 6.

In each of FIGS. 4B-4D, NewArray 410 may include a first row 412 of new indices, organized in ascending order as in row 404 of standard array 400. However, unlike standard array 400, codewords in NewArray 410 are associated with indices that can quickly be derived from the corresponding codeword strings.

In particular, each index in row 412 of NewArray 410 may be associated with a record comprising at least three fields. A first field, in row 414, may be designated as an IntegerNum field for each record in the array. The values stored in the IntegerNum fields of row 414 may be integer values derived from and uniquely associated with codeword strings. A second field, in row 416, may be designated as a sub-index field, which may provide a linking index to a child record in the array. Finally, a third field, in row 418, may be an OldIndex field, uniquely associating the new indices ("Newindex") in row 412 with the old indices in row 404 of standard array 400. A fourth field (not shown) containing the codewords from row 402 of standard array 400, which correspond to each associated old index, may also be included or may actually replace the old indices in the third field at row 418. One or more functions may be applied to each codeword string to derive the new indices and establish the unique association with each old index, in accordance with the methods in FIGS. 5 and 6. The derivation of each entry in NewArray 410 is explained in greater detail below with reference to FIGS. 5 and 6. Initially, however, all entries in NewArray 410 may be set to an initialized value, e.g. −1, as shown in FIG. 4A.

Figure 5:
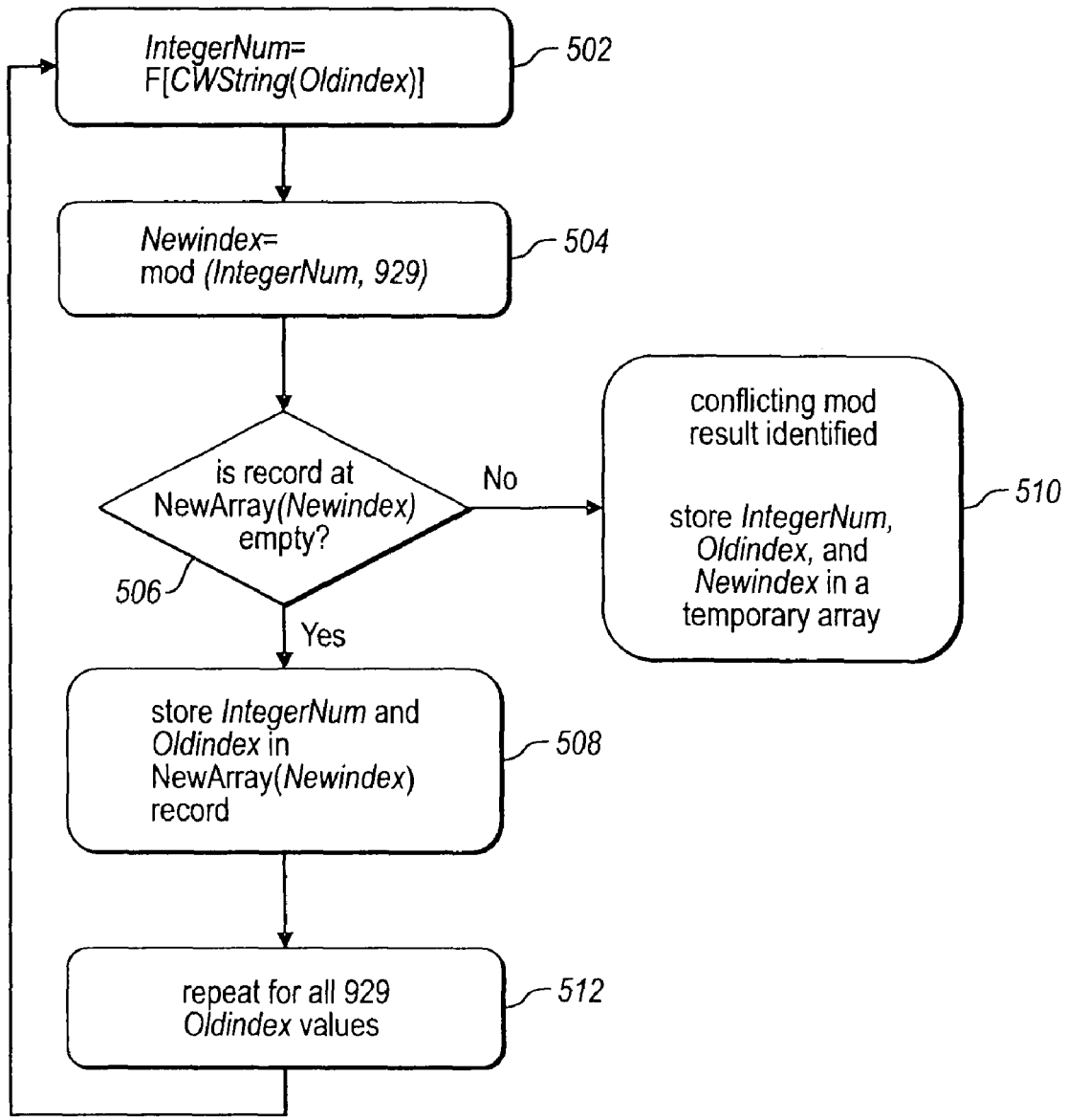
FIG. 5 illustrates a first flow diagram describing one example of a method of forming the new codeword array of FIGS. 4B-4D.
Figure 6:
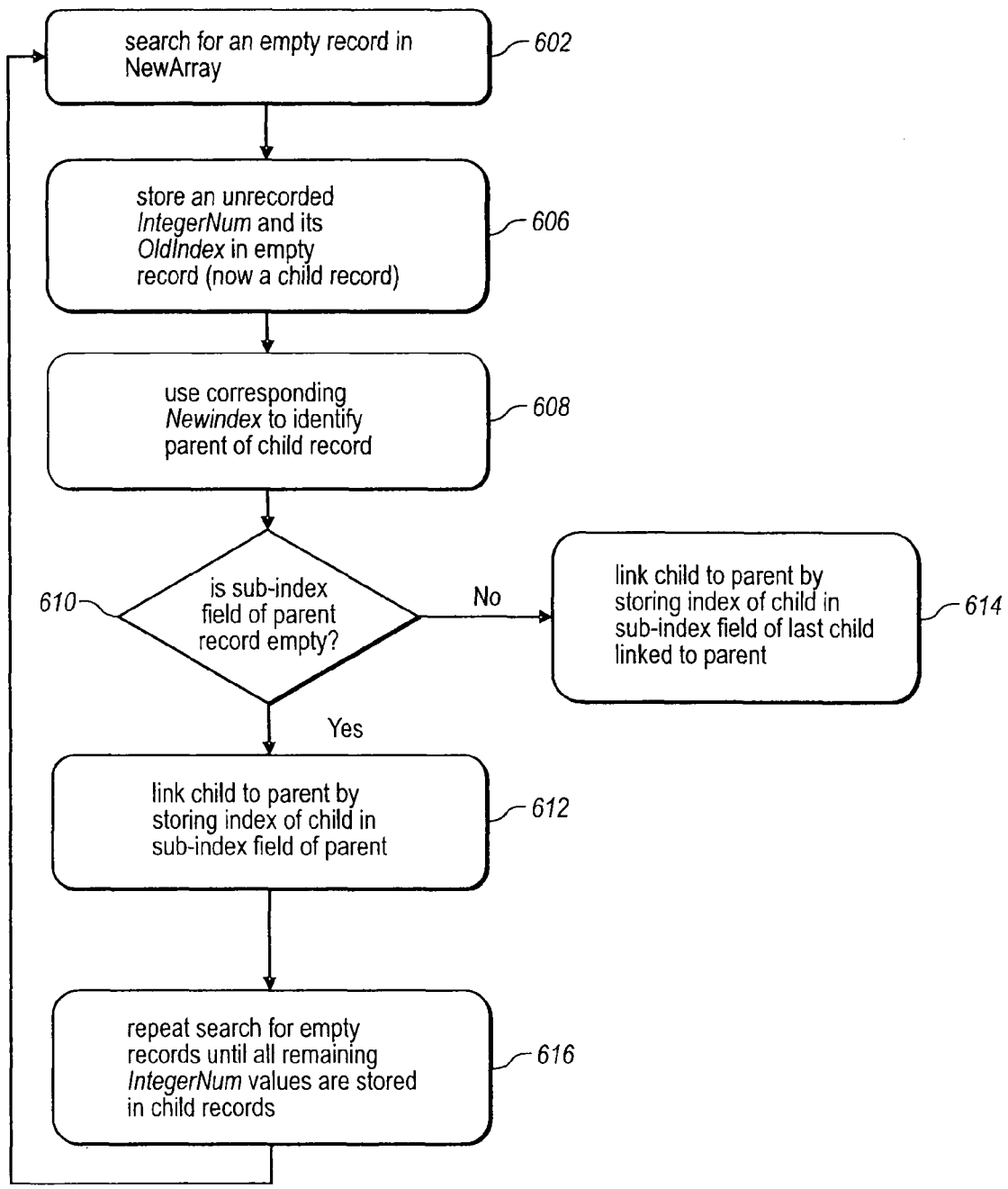
FIG. 6 illustrates a second flow diagram describing one example of a method of forming the new codeword array of FIGS. 4B-4D.

FIGS. 5 and 6 illustrate one embodiment of a method that can be used to form NewArray 410. NewArray 410 uniquely associates each codeword string with a new index that can be derived from the codeword string. To accomplish the unique association, a function may be performed on each codeword string (stage 502). The function may be designed to output a different positive integer—IntegerNum—for each codeword string. Then, a modulo operation may be performed on IntegerNum using the number of codewords (929) as the divisor to derive a new index value, Newindex (stage 504).

Because the modulo operation is not an invertible operation (i.e., its inputs cannot be uniquely determined from its outputs), a portion of the IntegerNum values derived at stage 502 can result in the same Newindex. For example, an IntegerNum of 930 and an IntegerNum of 1859 both correspond to an index of 1 in the modulo operation of stage 504. Thus, before associating an IntegerNum with a particular Newindex in the array, it is first confirmed that no other IntegerNum has previously been associated with the Newindex calculated in stage 504. This may be accomplished by, for example, checking if an IntegerNum field in the record stored at NewArray (Newindex) is set to the initialization value (stage 506). If the initialization value (−1) occupies the IntegerNum field, this indicates that the record is empty and the IntegerNum value and Oldindex may be associated with the Newindex of that record by, for example, storing IntegerNum and Oldindex in their respective fields of the record at NewArray(Newindex) (stage 508). If, however, there is a conflict because another IntegerNum and Oldindex is already associated with the Newindex calculated at stage 504, the IntegerNum, Oldindex, and Newindex values are stored separately in a temporary array and are assigned to a record in NewArray 410 later (stage 510). The stages may then be repeated beginning with stage 502 for the next codeword string (stage 512). After an IntegerNum has been calculated for all codeword strings in a set of codewords, the method may then proceed to the stages shown in FIG. 6.

FIG. 4C depicts how NewArray 410 might appear before the stages in FIG. 6 are performed. For example, the records at indices 1, 3, 395, and 928 are non-empty, whereas the records at indices 0 and 2 are empty, as indicated by the −1 values in NewArray(0) and NewArray(2). Thus, the unassociated IntegerNum values stored in the temporary array at stage 510 may be assigned to the remaining empty records in NewArray 410. Moreover, as each IntegerNum value is stored, each formerly empty record may be linked—using the sub-index fields of row 416 in NewArray 410—with the record in which the IntegerNum value would have been stored were it not for the conflict identified earlier at stage 506.

FIG. 6 depicts in detail an exemplary method for assigning the conflicting IntegerNum values remaining from the method of FIG. 5 to the empty records in NewArray 410. First, NewArray 410 may be searched for an empty record (stage 602). After an empty record is identified it may be "converted" into a child record, using data in the temporary array (stages 606-614). For purposes of explanation, a record may be referred to as a child record if it is referenced in the sub-index field of another record, i.e., a parent record. Moreover, a child record may reference yet another child record in its sub-index field and may thus be both a child and a parent record.

The method of FIG. 6 may assign an unrecorded IntegerNum value and its corresponding Oldindex (from the temporary array created in stage 614) to the identified empty record in NewArray 410 (stage 606). For example, as shown in FIG. 4D, IntegerNum value, 1859, and a corresponding Oldindex value, 681, may be stored in NewArray(0). Next, using the Newindex associated with the IntegerNum value, the parent record of the newly converted child record may be identified (stage 608). If the sub-index field of the identified parent record is empty (stage 610), the child record may be linked to the parent record by storing an index of the child record, i.e., a sub-index, in the sub-index field of the parent record (stage 612).

For example, if the record at index 1 in NewArray 410 (i.e., NewArray(1)) has already been associated with an IntegerNum value of 930, as shown in FIG. 4C, an empty record, such as NewArray(0), may be used to store the IntegerNum value, 1859, because 1859 "conflicts" with 930. (That is, mod(1859,929) equals mod(930,929), resulting in a conflict.) To resolve the conflict, the empty record, NewArray(0), may become the child record referenced by NewArray(1). Specifically, the index 0 may be stored as a sub-index in the sub-index field of NewArray(1), as shown in row 416 in FIG. 4D.

If a parent record's sub-index field is not empty, however (stage 610), the newly converted child record may be linked to the last or "youngest" child of the parent record (stage 614). This may be accomplished by following the sub-indices indicated by the sub-index field(s) of the parent's child/children record(s) until a child record having an empty sub-index field, i.e., the "youngest" child, is identified. The "youngest" child may then become a parent to the new child record by filling its empty sub-index field with the new child record's index. By doing so, the new child record then becomes the "youngest" child in the chain of linked records.

Thus, continuing the example above, if the function in stage 502 outputs another conflicting IntegerNum value, e.g., 2788 (whose Newindex is 1, like that of 1859 and 930), the "youngest" child of NewArray(1) may be identified by following its sub-index field value, i.e., 0, to the record at NewArray(0). Then, the empty record in which the IntegerNum value of 2788 is stored, e.g., NewArray(2), may become the child record referenced by NewArray(0). Specifically, the index 2 may be stored as a sub-index in the sub-index field of NewArray(0), as shown in row 416 in FIG. 4D.

After an empty record has become a child record, with an IntegerNum value and its corresponding OldIndex stored therein, and an appropriate link has been made to the child record, the method of FIG. 6 may be repeated (stage 616). The repetition may end when all remaining IntegerNum values have been stored in child records (stage 616), thus completely filling up the records of NewArray 410, as shown in FIG. 4D.

Figure 7:
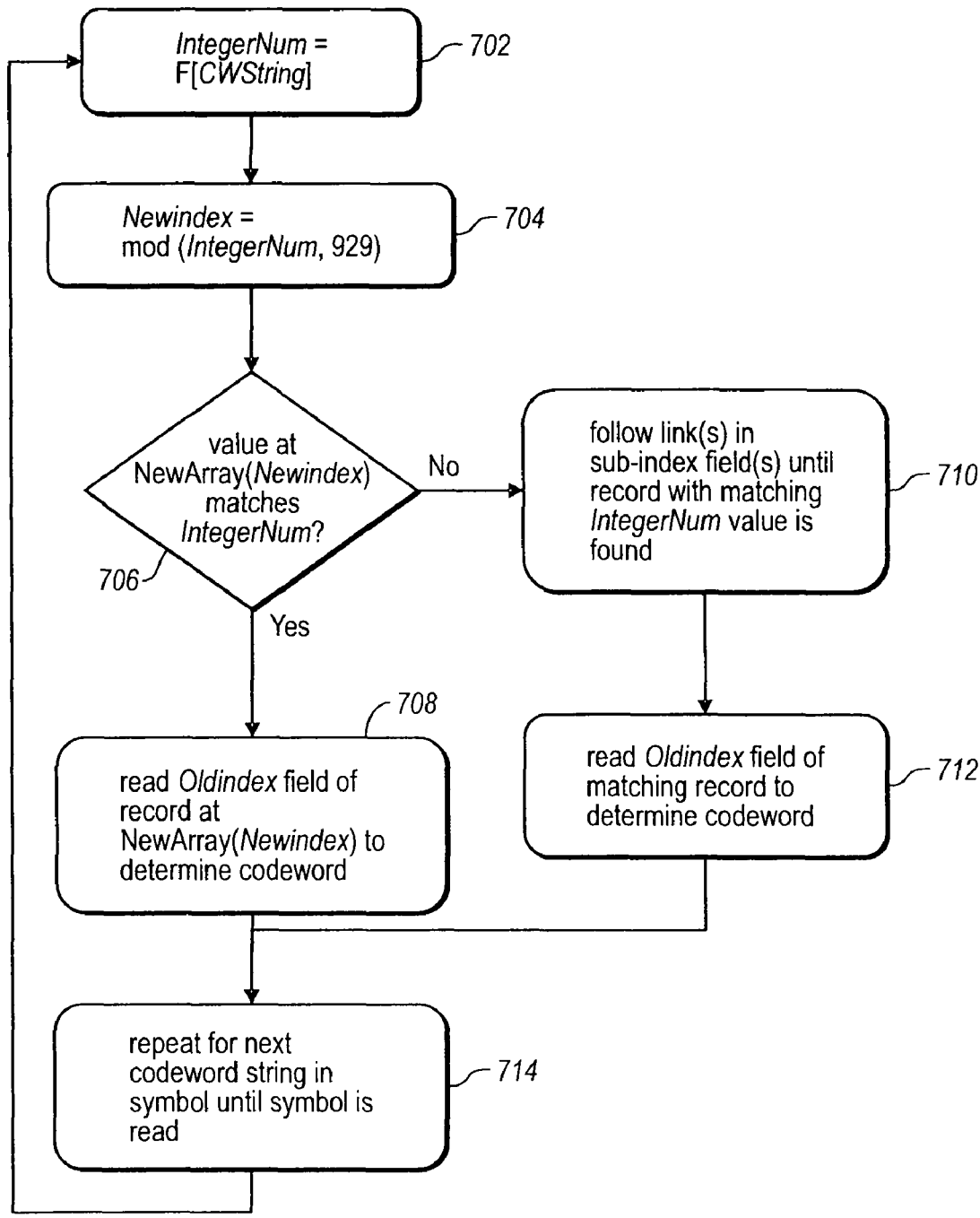
FIG. 7 illustrates a flow diagram describing one example of a method of decoding a data-encoding symbol using the new codeword array of FIGS. 4B-4D.

FIG. 7 illustrates one embodiment of a method for decoding the data encoded in a symbol, such as symbol 100. First, codeword string may be read from symbol 100 and a corresponding, unique IntegerNum value may be calculated by applying a function to the codeword string—the same function, for example, that is applied at stage 502 in FIG. 5 to form original entries in NewArray 410 (stage 702). Then, as in stage 504 of FIG. 5, a modulo operation may be performed on IntegerNum using the number of codewords (929) as the divisor to derive a new index value, NewIndex (stage 704). If a value stored in the IntegerNum field of the record at NewArray(NewIndex) matches the IntegerNum value (stage 706), then an OldIndex field of the record at NewArray(NewIndex) may be read to determine a codeword corresponding to the codeword string (stage 708).

For example, if an IntegerNum of 930 is output by the function (stage 702), then the modulo operation (stage 704) results in an index of 1. The IntegerNum field of the record at NewArray(1) may then be checked to determine if it matches the IntegerNum value output by the function. Because in this example 930 matches the IntegerNum value at NewArray(1) (as shown in row 414 in FIG. 4D), the OldIndex field of the record at NewArray(1) may then be accessed to determine an actual index for the codeword corresponding to the codeword string. In row 418 in FIG. 4D, for example, the actual index corresponding to an IntegerNum of 930 is shown as being 249.

If, however, the value in the IntegerNum field at NewArray(NewIndex) does not match the IntegerNum value calculated at stage 702, the sub-index field in the record at NewArray(NewIndex) may be accessed including, if necessary, the sub-index fields of any child records linked thereto, until a record with a matching IntegerNum value is found (stage 710). A codeword corresponding to the codeword string may be determined by reading the value stored in the OldIndex field of the matching record (stage 712). The process may then be repeated beginning with stage 702 for another codeword string read from symbol 100 until symbol 100 is completely read (or until an error is encountered) (stage 714).

Figure 8:
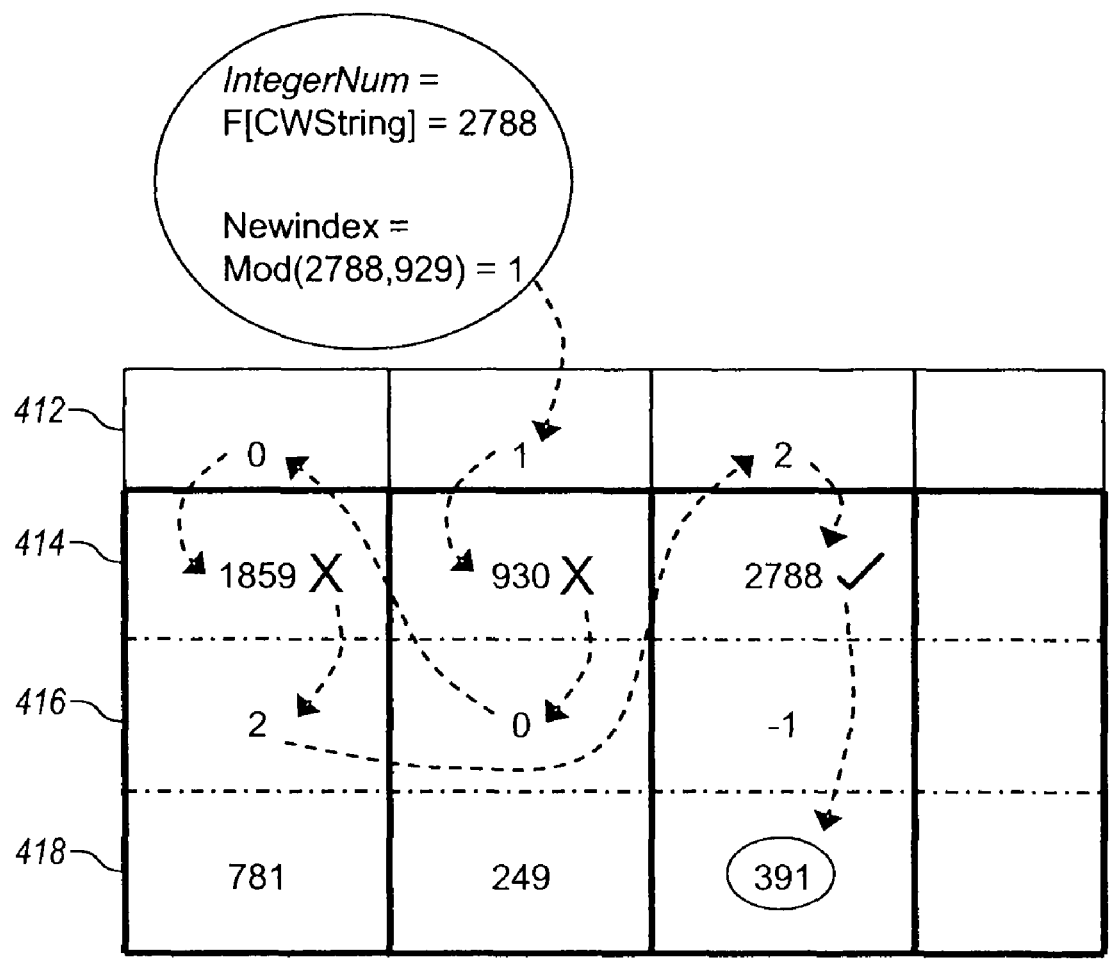
FIG. 8 illustrates a portion of the new codeword array of FIGS. 4B-4D for purposes of further illustrating the method of FIG. 7.

FIG. 8 illustrates a portion of NewArray 410 with various arrows illustrating an exemplary implementation of stage 710 in the method of FIG. 7. For example, if at stage 702 an IntegerNum value of 2788 is calculated, the corresponding NewIndex will be 1 and 2788 will be compared with the value in the IntegerNum field at row 414 of NewArray(1). As shown in FIG. 8, however, the value in this field is 930 and thus a mismatch will occur, indicated by an "X" in FIG. 8. Accordingly, a sub-index in the sub-index field at NewArray(1) may then be accessed, which contains the value 0 and therefore links to the child record at NewArray(0). A comparison may then be made between 2788 and the value in the IntegerNum field of the child record at NewArray(0). Since this value is not 2788, a sub-index in the sub-index field at NewArray(0) may then be accessed, which links to the child record at NewArray(2). Finally a match occurs between 2788 and the value stored at NewArray(2) (indicated by a check mark). Thus, an OldIndex field of the child record at NewArray(2) may be accessed to determine a codeword index that corresponds to the codeword string associated with the IntegerNum value, 2788.

Although the example shown in FIG. 8 involves linking twice, from a parent record to a first child record and then to a second child record, the number of links may vary for any particular codeword string. For example, for an IntegerNum value of 1859, only one link may occur in the version of NewArray 410 shown in FIG. 8. Alternatively, more than two links may be required for other codeword strings. However, a high number of links would tend to increase processing time for decoding a symbol. Moreover, because each conflicting mod result at stages 504 and 704 corresponds to another link in NewArray 410, the function applied to codeword strings at stages 502 and 702 may be appropriately selected to minimize conflicting mod results. The following is one exemplary function that may be applied to calculate IntegerNum from a codeword string of 8 bar and space widths:

$$IntegerNum = (bar_o + space_o)*2^{20} + (bar_1 + space_o)*2^{16} + (bar_1 + space_1)*2^{12} + (bar_2 + space_1)*2^8 + (bar_2 + space_2)*2^4 + (bar_3 + space_2)$$

where each bar/space value corresponds to a bar/space width normalized by a standard codeword string width. For example, codeword string "31111136" corresponds to $bar_0=3$, $space_0=1$, $bar_1=1$, and so on. Thus, applying the function above to the codeword string "31111136" may result in an IntegerNum value of 4334116, i.e., $(3+1)*2^{20}+(1+1)*2^{16}+(1+1)*2^{12}+(1+1)*2^8+(1+1)*2^4+(1+3)$.

The stages shown in FIGS. 5-7 are only exemplary and may be modified in various ways. For example, the order of stages may be varied, certain stages may be omitted and/or additional stages may be added. In addition, certain stages may be carried out in parallel. For example, although FIGS. 5-7 each indicate a linear repetition of the stages, the stages may instead be carried out in parallel, thereby reducing the number of repetitions required.

Figure 9:
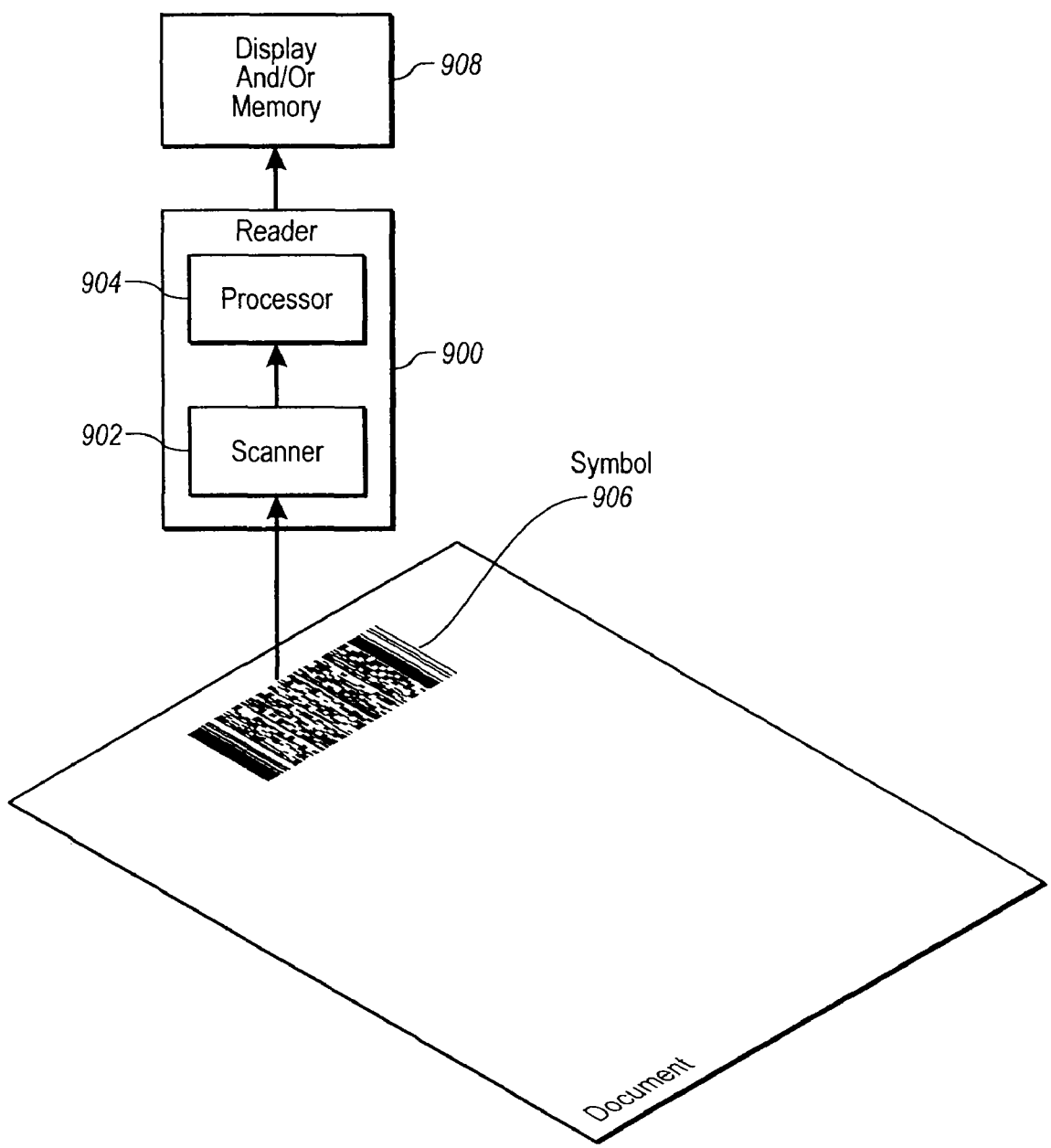
FIG. 9 illustrates an exemplary bar code reader for decoding data encoded in a symbol.

FIG. 9 illustrates an example device for implementing the method of FIG. 2 and/or the methods of FIGS. 5-7. Reader 900 may be a bar code reader including a scanner 902 and a processor 904. Reader 900 may read symbols such as symbol 906 having an unknown orientation with respect to reader 900. Processor 904 may control scanner 902 to scan symbol 906 and may implement the method described above in connection with FIG. 2 to determine an orientation of symbol 906. Processor 904 may also implement the method described above in connection with FIGS. 6 and 7 to form a NewArray 410 and the method described above in connection with FIG. 8 to decode data using NewArray 410. The decoded data may then be sent by processor 904 to a display and/or memory device 908 for consumption by an operator of reader 900 or for processing by another device, such as a general purpose computer or an application specific device that is operably connected to or integrated with reader 900. For example, a processor in an operably connected device, such as a general purpose computer, may perform all or a portion of the stages in FIGS. 2 and 5-7 and/or additional processing stages.

Embodiments herein may comprise a special purpose or general-purpose computer including various computer hardware implementations. Embodiments may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for generating a codeword array for use in decoding data, the method comprising:
   using a processor to:
   process a first string of data to generate a first value by performing a function on the string to output an integer,
   perform a modulo operation on each integer using a number of codewords as divisor to derive the first value;
   process the first value to generate a first index;
   store the first value in a first field of a first record in the codeword array, the first record corresponding to the first index; and
   store codeword information associated with the first string in a second field of the first record.

2. The method of claim 1, wherein the codeword information associated with the first string comprises at least one of a first codeword associated with the first string and an index associated with the first codeword.

3. The method of claim 1, wherein processing the string to generate the first value comprises computing a function of the string.

4. The method of claim 1, further comprising:
   using the processor to:
   process a second string of data to generate a second value;
   process the second value to generate a second index;
   store the second value in a first field of a second record in the codeword array; and
   if the second index matches the first index, store a sub-index corresponding to the second record in a third field of the first record; and
   store codeword information associated with the second string in a second field of the second record.

5. The method of claim 4, wherein the codeword information associated with the second string comprises at least one of a second codeword associated with the second string and an index associated with the second codeword.

6. A device for generating a codeword array for use in decoding data, the device comprising:
   a processor that:
   processes a first string of data to generate a first value by performing a function on the string to output an integer,
   performs a modulo operation on each integer using a number of codewords as divisor to derive the first value;
   processes the first value to generate a first index;
   stores the first value in a first field of a first record in the codeword array, the first record corresponding to the first index; and
   stores codeword information associated with the first string in a second field of the first record.

7. The device of claim 6, wherein the codeword information associated with the first string comprises at least one of a first codeword associated with the first string and an index associated with the first codeword.

8. The device of claim 6, wherein processing the string to generate the first value comprises computing a function of the string.

9. The device of claim 6, wherein the processor further:
   processes a second string of data to generate a second value;
   processes the second value to generate a second index;
   stores the second value in a first field of a second record in the codeword array; and
   if the second index matches the first index, stores a sub-index corresponding to the second record in a third field of the first record; and
   stores codeword information associated with the second string in a second field of the second record.

10. The device of claim 9, wherein the codeword information associated with the second string comprises at least one of a second codeword associated with the second string and an index associated with the second codeword.

* * * * *